Feb. 16, 1937.  C. H. WILLIS  2,071,189
ELECTRIC VALVE CONVERTING SYSTEM
Filed March 26, 1935  2 Sheets-Sheet 1

33 mf
3ϕZ 31.4%

33 mf
3ϕZ 19.1%

Inventor:
Clodius H. Willis,
by Harry E. Dunham
His Attorney.

Feb. 16, 1937.  C. H. WILLIS  2,071,189
ELECTRIC VALVE CONVERTING SYSTEM
Filed March 26, 1935    2 Sheets—Sheet 2
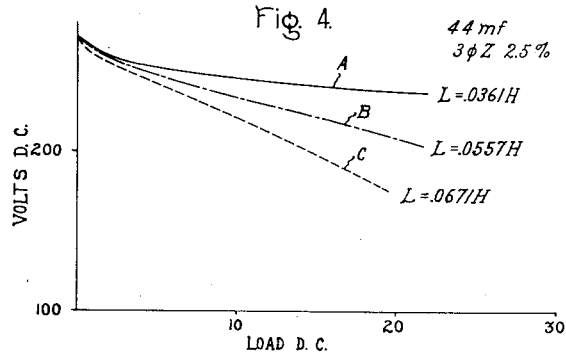
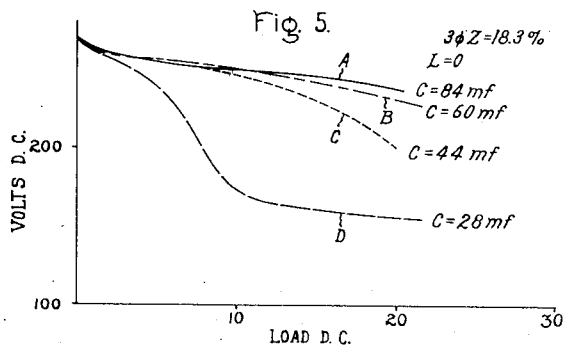
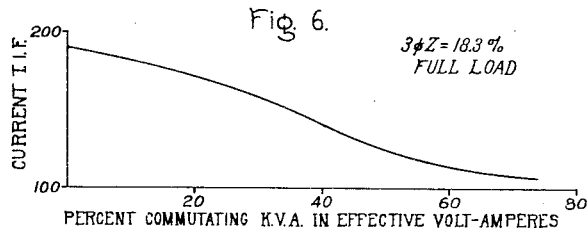
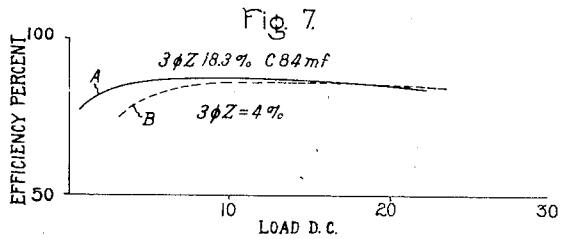
Inventor:
Clodius H. Willis,
by Harry E. Dunham
His Attorney.

Patented Feb. 16, 1937

2,071,189

UNITED STATES PATENT OFFICE 2,071,189

ELECTRIC VALVE CONVERTING SYSTEM

Clodius H. Willis, Princeton, N. J., assignor to General Electric Company, a corporation of New York Application March 26, 1935, Serial No. 13,056

7 Claims. (Cl. 175—363)

My invention relates to electric valve converting systems, and more particularly to such systems including electric valves for transmitting energy between direct and alternating current circuits.

This application is a continuation in part of my application, Serial No. 582,587, filed December 22, 1931, and entitled Electric valve converting systems.

Heretofore there have been devised numerous apparatus including electric valves for transmitting energy between direct and alternating current circuits, or alternating current circuits of different frequencies, phases, or voltages. In my copending applications, Serial Nos. 582,587 and 714,473, filed December 22, 1931 and March 7, 1934, respectively, all assigned to the same assignee as the present application, there are disclosed certain electric valve converting apparatus which are adapted to the requirements of valves of the electric discharge type containing an ionizable medium, and which substantially eliminate the power factor limitations on the alternating current circuit. Each of the apparatus comprises a polyphase inductive network and a plurality of electric valves, the connections of each group of valves to its associated network being in staggered phase relation with respect to the connection of the valves of the other apparatus. Interposed in the connections between the two apparatus in the direct current circuit is a circuit which produces commutation between alternate valves of each of said groups of valves. This circuit comprises a two-part inductive winding and a special commutating circuit. The inductive winding has sufficient reactance effectively to prevent the transfer of current, or in other words, to prevent commutation between the two electric valve apparatus. The special commutating circuit connected in parallel thereto, however, permits the load current gradually to transfer back and forth between the two valve apparatus. While the arrangements disclosed in these applications are highly satisfactory due to the fact that each of the apparatus shown comprises a polyphase inductive network having a large number of legs or branches, it has been noted that when such networks are reduced to the point where we have a simple double-Y circuit this arrangement will result in one having a reduced transformer utility.

It is an object of my invention, therefore, to provide an improved electric valve converting system for transmitting energy between direct and alternating current circuits in which the networks of each apparatus will be simple, thus utilizing a small number of tubes and yet obtaining a circuit of high utility.

It is another object of my invention to provide an improved electric valve converting system wherein means are provided for selectively reducing the effect of the reactance of the alternating current circuit and the interphase inductive windings thereby to control the output voltage in the direct current regulation characteristics.

It is a further object of my invention to provide an improved electric valve converting system wherein a method of and means for minimizing the telephone interference factor are provided.

In accordance with my invention, direct and alternating current circuits are interconnected through electric valve converting apparatus having a pair of bi-phase secondary networks which are connected to a three-phase alternating current line through a T or Scott-connected primary network. By the term bi-phase winding or network I intend to include the mid-tapped secondary winding of a single phase primary winding transformer. Interposed between the bi-phase networks is a circuit which produces commutation so that the load current gradually transfers back and forth between the two bi-phase networks. This commutating circuit, which is the same as that disclosed in my copending applications referred to above, comprises a two-part inductive winding arranged in parallel to a special commutating circuit. The reactance of this circuit, the reactance of the two-part inductive winding, and the reflected reactance of the associated alternating current circuit cooperate to produce commutation, and to provide the desired characteristics of the apparatus.

For a better understanding of my invention, together with other and further objects thereof, reference may be had to the following description taken in connection with the accompanying drawing in which Fig. 1 illustrates diagrammatically the preferred embodiment of my invention for transmitting energy between a direct current circuit and a polyphase alternating current circuit, and Figs. 2, 3, 4, 5, 6, and 7 graphically illustrate the operating characteristics of my invention.

Referring to Fig. 1 of the drawings, there is illustrated a four-phase half-wave arrangement embodying my invention for transmitting energy between a three-phase alternating current circuit 10 and direct current circuit 11. The alternating current line 10 is connected to a T or Scott-connected primary winding 12 which is in inductive relation to the bi-phase secondary windings 13 and 14. The outer extremities of the bi-phase windings 13 and 14 are connected by means of the electric valves 15, 16, 17, and 18 to one side of the direct current circuit 11 and the common connections or midpoints of the windings 13 and 14 are connected through a two-part inductive winding 19 to the other side of the direct current line. The two-part inductive winding 19 is so arranged that the two portions thereof have a cumulative magnetizing effect upon the alternating current components with the result that the sum of the currents supplied by the two bi-phase windings is maintained substantially constant. This inductive winding is given sufficient reactance effectively to prevent the transfer of current, or in other words, to prevent commutation between the two groups of valves 15, 16 and 17, 18. A special commutating circuit comprising an inductor 20 and a capacitor 21 is connected across this inductive winding to permit the load gradually to transfer back and forth between two valve groups, thereby obtaining four-phase half-wave rectifier operation from a circuit which normally would produce double bi-phase operation. The grid circuits have been omitted in this figure for the sake of clarity, but it is to be understood that any suitable grid circuit may be used as for instance, the grid circuit disclosed in the above mentioned parent application, Serial No. 582,587.

As is well understood by those skilled in the art, electric valves 15 to 18 are each provided with an anode, a cathode and a control electrode and may be any of the several types well known in the art, although I perefer to use valves of a vapor electric discharge type or a type containing an ionizable medium. It may be desirable also, to include a smoothing reactor (not shown) in the direct current circuit to maintain the direct current constant.

If in Fig. 1 the commutating circuit comprising the capacitor 21 and the inductor 20 were omitted we would have a double bi-phase converting circuit, the operation of which is well known to those skilled in the art. Under such conditions, the two-part inductive winding 19 would operate as an interphase transformer normally preventing commutation between the valves associated with the windings 13 and 14. Commutation would occur between the valves 15 and 16 as one group and between the valves 17 and 18 as the other group.

The addition of the commutating circuit 20, 21, however, causes commutation between the valves connected to the winding 13 and the valves connected to the winding 14 so that commutation from one of the valves of the winding 13 to one of the valves of the winding 14 occurs during the time intervals substantially equal to the time displacement between the conductive cycles of sequentially adjacent valves so that but one electric valve of each of the windings 13, 14 is conductive at any instant.

Various operating characteristics pertaining to telephone interference factor, power factor or load regulation of the apparatus disclosed in Fig. 1 may be obtained by creating certain relations between the inductive reactance of the transformer network and supply circuit and the reactance of the commutating circuit comprising the inductor 20 and the capacitor 21. If it is desired to change the value of the effective inductive reactance of the apparatus, the value of the inductive reactance of any of the windings 12, 13, 14 and 19 may be changed or inductors 22, 23 and 24 may be inserted in the three-phase circuit. A similar effect may be obtained by varying the size of the inductor 20. The variations possible in the operating characteristics of this apparatus may best be understood by reference to Figs. 2, 3, 4 and 5. In the instance at hand for which the particular values given in these figures are applicable, it is assumed that the apparatus was connected to a three-phase 220 volt system. The rating of the rectifier is assumed to be 20 ampere 250 volt D. C., a theoretical no-load four-phase voltage, as 280 volts. In determining the percent line reactance, the rectifier network impedance was measured with a three-phase sinusoidal voltage when all the transformer secondaries were short circuited. Using the line reactance thus determined and the effective value of the line current to give rated direct current load the percent reactance was computed. The line reactance as computed therefore includes the transformer reactance and any additional reactance which may have been inserted by means of the inductors 22, 23, and 24. While this method of measuring the transformer reactance introduces a slight error inasmuch as it assumes that both transformer secondary windings are operating simultaneously, this discrepancy is not great enough to effect the operation seriously inasmuch as the major portion of the reactance is in the transformer 12 and the additional inductors 22, 23, and 24.

In Figs. 2 and 3 the dotted line R represents the regulation as calculated from the effective resistance of the transformer windings and inductors. The curves marked A show the actual operating voltage obtained with the commutating circuit comprising the inductor 20 and the capacitor 21 adjusted for a maximum direct current voltage output. The dashed line B shows the operating characteristic if the commutating circuit 20, 21 is omitted.

It will be noted in Fig. 2 that the curve A decreases rapidly in the vicinity of 30 ampere load due to the phenomenon known as "prestarting of anodes" which is discussed in "Principles of Mercury Arc Rectifiers and Their Circuits" by D. C. Prince and F. B. Vogdes. Towards the end of the curve the rectifier has begun to operate as the double bi-phase rectifier with a conducting period greater than 180 degrees with the result that the voltage is correspondingly reduced. In some instances it may be highly desirable to provide a characteristic, such as shown at A in Fig. 2, where there is a break in the regulation curve. This break is determined by the relative amount of inductance in the alternating current line and in the commutating circuit as well as by the total inductance. By comparison with Fig. 3 it will be noted that here the curve A is a continuous straight line due to the fact that the total three-phase impedance measured was different from that in Fig. 2.

The regulation curve shown in Fig. 4 shows the effects of increasing the effect of the inductor 20 above the value suitable for maximum direct current voltage output. Hence, it is quite apparent that the regulation curve of the rectifier can be controlled independently of the transformer or line reactance by suitably adjusting the commutating circuit. Fig. 5 shows the effects obtained when the commutating circuit has a predominantly capacitive reactance. It is seen that the load characteristic may be varied also over a wide range by changing the size of the capacitor 21.

In designing the apparatus of the type disclosed it is generally desirable to keep the telephone interference factor as small as possible. As is well known, the telephone interference factor T. I. F. is a ratio indicating the relative interfering effect of any wave form of voltage or current when acting through inductive coupling on a telephone circuit. The T. I F. is the ratio of the square root of the sum of the squares of the weighted values of all the sine-wave components (including in alternating waves both fundamental and harmonics) to the R. M. S. of the wave. From the weighted values of the sine-wave components it is apparent that the harmonics of the fundamental wave play an important part in the T. I. F. The telephone interference factor of a rectifier or converter may be greatly reduced by increasing the commutating reactance. However, this generally is detrimental to the direct current regulation. In accordance with my invention, however, this reactance may be increased without increasing the direct current regulation. This will be apparent from observation of curve A in Figs. 4 and 5 where the curve A of Fig. 4 shows the characteristics of a circuit having a three phase line reactance of but 2.5% whereas curve A of Fig. 5 is a characteristic of a circuit having a much greater three phase line reactance of 18.3%.

The method of minimizing or reducing the telephone interference factor comprises increasing the inductive reactance of the apparatus to a value in excess of the normal reactance permissible for efficient operation and then neutralizing at least a portion of this reactance at the normal operating frequency. The commutating reactance of the apparatus may be increased by increasing the reactances of the individual components of the inductive windings, or by adding inductors in the primary side of the circuit such as the inductors 22, 23, and 24 in Fig. 1, or by increasing the inductive value of the inductor 20 of the commutating circuit. This additional or increased inductive reactance is then neutralized by the introduction of a capacitive reactance into the circuit by means of the commutating circuit comprising the reactor 20 and the capacitor 21. While this increased inductive reactance has been neutralized at the normal operating frequency of the converter, and therefore has no effect upon the fundamental frequency of the apparatus, it is apparent that it will have a considerable effect upon the harmonics of the fundamental frequency thereby greatly reducing the telephone interference factor. By making this commutating circuit comprising the reactor 20 and the capacitor 21 as the predominantly capacitive reactance, it is apparent from the observation of Figs. 4 and 5 that an arrangement having the characteristics such as shown in Fig. 4 where the three phase line reactance is but 2.5% we may still have substantially the same characteristics as shown in Fig. 5 where the three phase line reactance has been increased to 18.3%, but the capacitor 20 of the commutating circuit has been substantially doubled in size.

Fig. 6 illustrates graphically how the current telephone interference factor is reduced by an increase in the commutating kv.-a. rating of the commutating circuit wherein the three phase line reactance of the alternating current network is equal to 18.3%.

Fig. 7 illustrates how the use of the commutating circuit comprises inductor 20 and the conductor 21 increases the efficiency of the apparatus particularly at light load. The solid line A shows operation with the commutating circuit and the dotted line B shows operation without the commutating circuit where the apparatus is operating as a double bi-phase rectifier.

Figure 1:
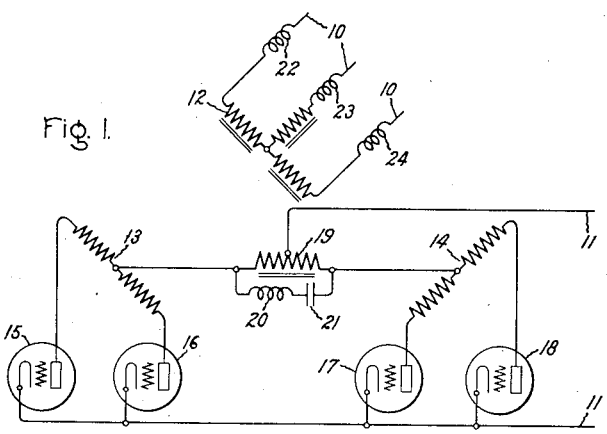
Figure 2:
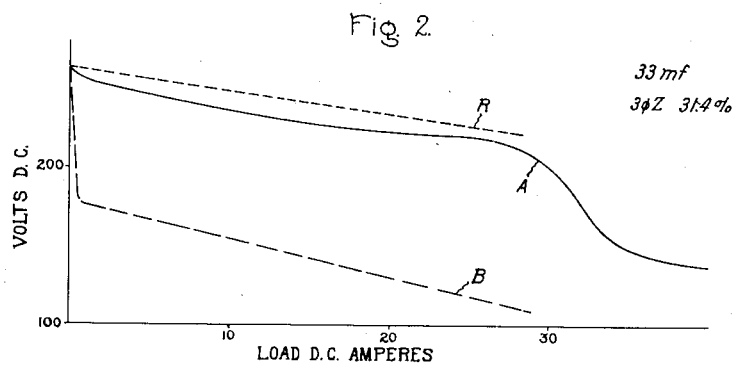
Figure 3:
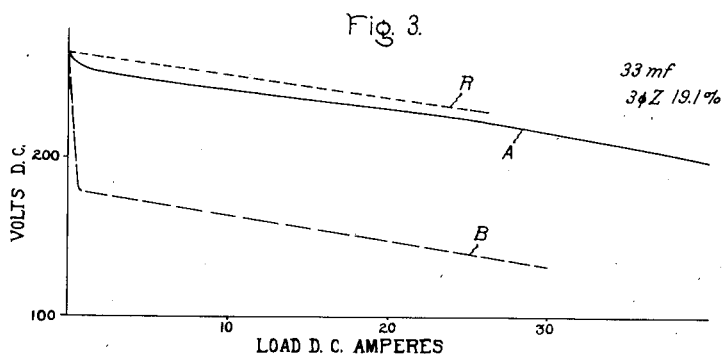

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States, is:—

1. The method of reducing the telephone interference factor in an electric valve converting system having a plurality of groups of valves associated with polyphase windings which are interconnected by a inductive winding which comprises increasing the effective inductive reactance of said apparatus in excess of the normal inductive reactance permissible for efficient operation, and introducing a capacitive reactance in parallel with said inductive windings for neutralizing at least such portion of said inductive reactance at the normal operating frequency as to maintain efficient operation of said system.

2. The method of reducing the telephone interference factor in an electric valve converting system having a plurality of electric valve apparatus each comprising a plurality of valves associated with a polyphase winding, said apparatus being interconnected by an inductive winding, which comprises introducing into said apparatus, an inductive reactance to increase the effective inductive reactance of said apparatus beyond the normal amount permissible for efficient operation so as to present a high reactance to waves which are harmonics of the fundamental operating frequency of said system, and introducing a capacitive reactance into said system so as to neutralize at least said increased inductive reactance and a portion of said normal inductive reactance at the normal operating frequency of said system.

3. The combination of an electric valve converting apparatus including a plurality of groups of valves associated with polyphase networks, said groups of valves being interconnected by an inductive winding, means for introducing into said apparatus an inductive reactance to increase the reactance of said apparatus above the normal amount permissible for efficient operation, and means for introducing a capacitive reactance into said apparatus for neutralizing at least said increased reactance and a portion of said normal reactance at the normal operating frequency of said system whereby the telephone interference factor of said apparatus will be reduced.

4. The combination for minimizing the telephone interference factor in an electric valve converting system comprising a direct current circuit, an alternating current circuit, a plurality of electric valve converting apparatus each comprising a polyphase winding and a plurality of electric valves for interconnecting said circuits, an inductive winding interconnecting said first windings with said direct current circuit, of means connected to said windings for increasing the inductive reactance of said system above the normal amount permissible for efficient operation so as to present a high inductive reactance to wave frequencies which are harmonics of the normal operating frequency of such system, and means connected across said last mentioned winding for neutralizing at least the increased inductive reactance at the normal operating frequency of said system.

5. In an electric valve converting system, the combination of a source of alternating current, a transformer network connected thereto comprising a Scott-connected primary winding and a plurality of bi-phase secondary windings, a direct current circuit, a plurality of groups of electric valves interconnecting said bi-phase secondary windings with one side of said direct current circuit, an inductive winding interconnecting the other side of said direct current circuit with said bi-phase secondary windings, and means connected across said inductive winding for producing current commutation between said groups of valves.

6. An electric valve converting system comprising a direct current circuit, an alternating current circuit, an electric valve converting apparatus interconnecting said circuits comprising a Scott-connected primary winding, a plurality of bi-phase secondary windings, a group of valves connecting each secondary winding with one side of said direct current circuit, and means for alternately transferring current between successive valves of said groups of valves including a commutating circuit connected between said secondary windings and the other side of said direct current circuit for introducing between said valve groups a potential effective periodically to transfer gradually the current between said apparatus whereby but one electric valve in each group is conductive at any given instant.

7. An electric valve converting system comprising a direct current circuit, an alternating current circuit, an electric valve converting apparatus connected therebetween comprising a Scott-connected primary winding, a plurality of bi-phase secondary windings, a group of valves for each of said windings for interconnection of said windings with one side of said direct current circuit, an inductive winding connected between said bi-phase windings and having an intermediate point thereon connected to the other side of said direct current circuit, means connected across said inductive winding for effecting commutation between said groups of valves and for partially neutralizing the inductive reactance of said windings, and means for increasing the effective inductive reactance of said system thereby to minimize the telephone interference factor.

CLODIUS H. WILLIS.